A. KOMP.
Mash Heater.
No. 68,210.  Patented Aug. 27, 1867.
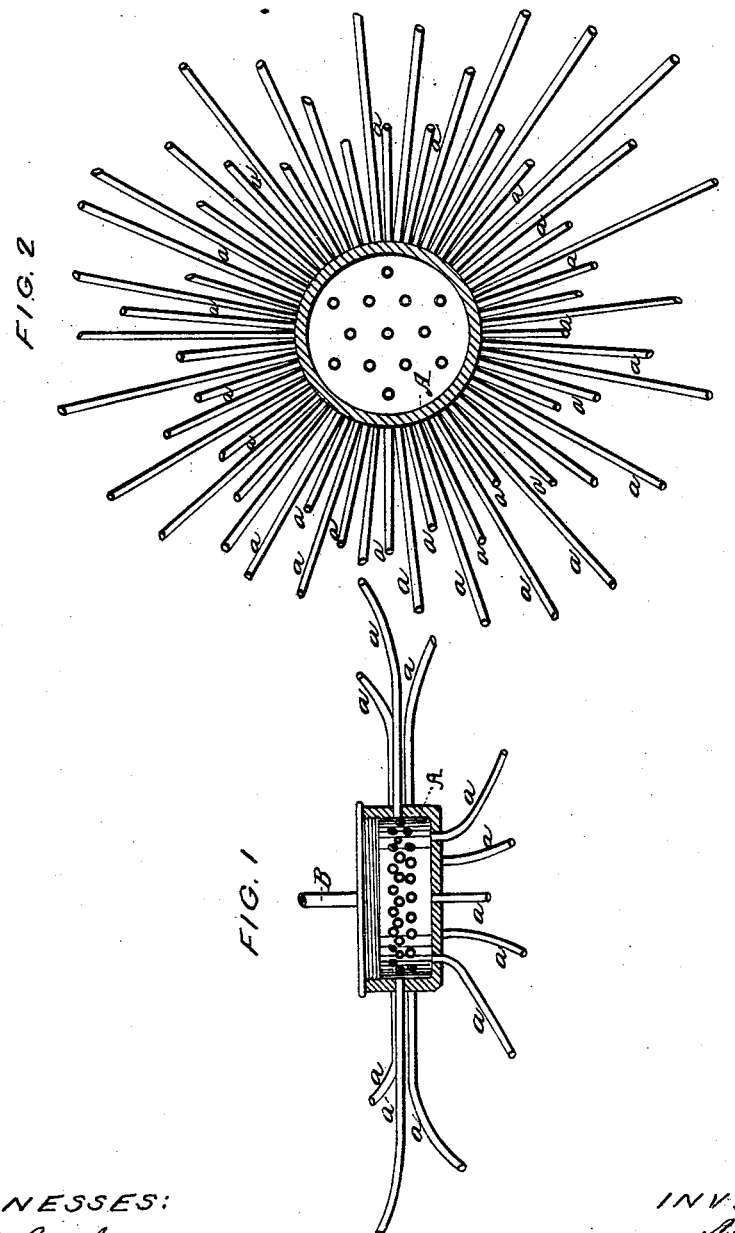

United States Patent Office.

A. KOMP, OF NEW YORK, N. Y.

Letters Patent No. 68,210, dated August 27, 1867.

---

IMPROVED STEAM-HEATING APPARATUS FOR BREWERS AND OTHERS.

---

The Schedule referred to in these Letters Patent and making part of the same.

---

TO ALL WHOM IT MAY CONCERN:

Be it known that I, A. KOMP, of No. 184 Fulton street, in the city, county, and State of New York, have invented a new and improved Steam-Heating Apparatus; and I do hereby declare that the following is a full, clear, and exact description thereof, which will enable those skilled in the art to make and use the same, reference being had to the accompanying drawing, forming part of this specification, in which drawing—

Figure 1 represents a transverse section of this invention.

Figure 2 is a plan or top view of the same.

Similar letters indicate corresponding parts.

This invention relates to a steam-heating apparatus, which is intended particularly for heating mash in distilleries, or for heating other liquids contained in suitable tanks, vats, or stills. Such heaters are usually composed of pipes, through which the steam is directly injected into the liquid to be heated, or of coils which connect with the steam-supply pipe, and which are situated at the bottom of the vessel containing the liquid to be heated, and provided with a large number of holes, through which the steam issues directly into the liquid. In all those cases the steam issuing from the heating pipes passes up through the liquid, and a large portion of said steam escapes uncondensed, which is apparent from the noise produced by such steam-heaters, and the best effect of the steam, which escapes uncondensed, is lost; and, furthermore, the noise created by the action of the escaping steam is very disagreeable for the persons engaged in conducting the heating operation, or otherwise employed in proximity to the vessels containing the liquid to be heated.

These disadvantages are avoided by my invention, which consists in providing the heating drum or pipe with a large number of small nozzles, of greater or less length, secured in said pipe or drum, and radiating from the same in all directions in such a manner that the steam-jets issuing from said nozzles, on coming in contact with the liquid to be heated, are sufficiently separated to cause each of them to come in contact with a distinct body of liquid, and the escape of any uncondensed steam from the liquid to be heated is effectually prevented until said liquid has attained the desired temperature, and consequently all the available heat of the steam is employed, and, furthermore, the disagreeable noise caused by the escape of steam from the liquid is avoided.

A represents a drum, which is intended to be introduced into the vessel containing the liquid to be heated, and which connects in any suitable manner with a steam pipe, B. From this drum radiates a series of small nozzles, $a$, of various lengths, in all directions, so that the steam admitted to said drum is divided into a large number of small jets, which issue through the nozzles into the liquid to be heated. By the use of said nozzles the steam-jets, on passing into the liquid to be heated, are thrown so far apart that each jet for itself is completely surrounded by the liquid and not influenced by the jets issuing from the adjoining nozzles, and consequently all the steam is condensed, no portion of the same being permitted to escape from the liquid in an uncondensed state.

The advantages of this arrangement are twofold: first, the latent heat of the steam, which is set free when the steam is condensed, causes the temperature of the liquid to be heated to rise rapidly, whereas if a portion of the steam is permitted to escape uncondensed, the heating effect is materially reduced; second, by condensing all the steam in the liquid, the noise produced by the steam escaping from the liquid is entirely stopped, and the heating operation is effected in perfect silence and with the greatest economy in steam. It is obvious that for the drum A a simple pipe or a series of pipes, or a coil, might be substituted without materially changing the effect.

I am aware that steam-coils perforated with a large number of small holes have been used for the purpose of disseminating the steam through the liquid to be heated, but in this case the jets of steam are so close together that the intervening strata of liquid are not able to produce a complete condensation, and if the holes are placed far apart, the quantity of steam discharging from the same is not sufficient to produce the required heating effect.

I do not claim, therefore, the arrangement of a large number of steam-jets issuing from a pipe or drum, but what I claim as new, and desire to secure by Letters Patent, is—

The arrangement of a series of small nozzles, $a$, in combination with the steam-heating drum or pipe A, substantially as and for the purpose described.

A. KOMP.

Witnesses:
   W. HAUFF,
   GEO. F. SOUTHERN.